July 24, 1923.
F. W. BONNER
NONGLARE EYESHIELD
Filed Feb. 23, 1922
1,462,532
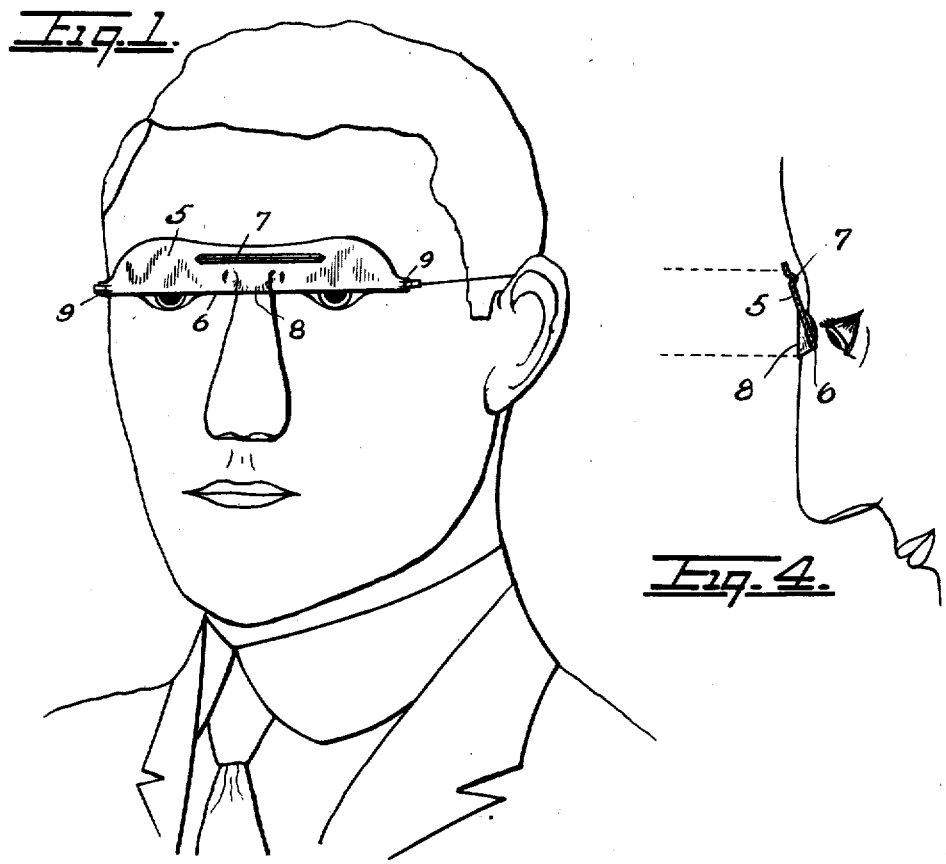
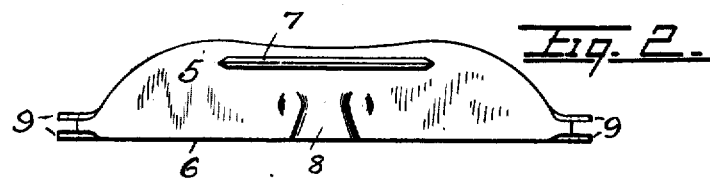
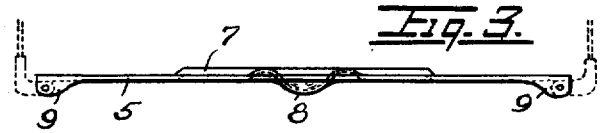
Inventor
Fred W. Bonner
Attorneys Patented July 24, 1923.

1,462,532

UNITED STATES PATENT OFFICE.

FRED W. BONNER, OF POTTSTOWN, PENNSYLVANIA.

NONGLARE EYESHIELD.

Application filed February 23, 1922. Serial No. 538,449.

*To all whom it may concern:*

Be it known that I, FRED W. BONNER, a citizen of the United States, residing at Pottstown, in the county of Montgomery and State of Pennsylvania, have invented certain new and useful Improvements in Nonglare Eyeshields, of which the following is a specification.

My invention relates to eye shields particularly adapted for night driving to cut-off the dangerous and blinding rays of light from the headlights of an approaching automobile, and my object is to provide a shield especially effective for the purpose and of new and simple construction as fully described in connection with the accompanying drawing, and the novel features of which are pointed out in the subjoined claims.

Fig. 1 is a perspective view showing a shield embodying my invention in place on the face of a wearer.

Fig. 2 is a front elevation of the shield alone, and Fig. 3 is a plan view thereof, temple connections being indicated in dotted lines.

Fig. 4 is a diagrammatic view showing a cross-sectional view of the shield in position on the face of a wearer and dotted lines indicating rays of light.

My improved shield is preferably formed from a sheet of stiff opaque material, such as aluminum, hard rubber or the like, and, as shown in the drawings, is formed with a flat vertically disposed wall portion 5, extending across the face of the wearer, the upper edge of which is preferably curved as shown to conform somewhat to the shape of the eyes, while the lower edge 6 thereof is formed in a straight horizontal line for a purpose hereinafter fully described. Near the upper marginal edge I prefer, as shown, to press in a horizontal rib or recess 7, to strengthen the shield against tendency to curve, and below this rib and intermediate the width of the shield, the wall 5 is bulged rearward and forward in a vertical plane as shown, to form a nose rest portion 8, and the outer side portions of the shield are preferably shaped and flanged as shown to form integral temple connecting ears 9, 9.

This shield may be provided with temple ear wires, as indicated in dotted lines in Fig. 3, or it may have a head band, or temple hook devices to hang the shield on a pair of spectacles or goggles, as required.

The use of my shield is as follows: Whether used alone or with glasses or goggles, the shield is adapted to be supported on the face of the wearer with the lower straight marginal edge 6 thereof extending in a horizontal line midway of the eyes, to cut-off entirely all rays of light passing directly to the upper half portions of the eyes, but leaving free and unobstructed vision to the lower half portions, as clearly seen in diagrammatic Fig. 4. By slightly tilting the head to cut-off direct vision of the approaching headlights behind the straight-edged wall 6 of the sheild, the dangerous blinding effect of the glare is removed, and clear vision of the road seen below the bottom edge of the shield is permitted.

I have found in practice that the head may be raised until the straight bottom marginal edge of the wall permits vision close up to the lower edge of the headlights without any blinding effect, giving a maximum and entirely safe range of vision for careful driving, and making clear to the operator not only the road, but any object or person in the path of his machine.

With my device there is no dimming of the vision at all, but merely the shielding of the eyes from the direct glare of the headlights, leaving full and unobstructed view below and up to the very edge of the source of the glare. My improved shield will be useful also against arc light glare, and the blinding rays of the sun when low in the sky, the bottom straight-edged wall permitting the seeing of objects lying in a line close to the edge of the sun, as long as the eye itself is shielded from direct view of the same.

My improved shield thus fully described is simple, neat and effective and most economically produced as by a single stamping and pressing operation of properly shaped dies, and can be made light in weight and comfortably cool as it does not hug the eye closely and only covers part of the same.

What I claim is:

1. As a new article of manufacture, a non-glare eye shield formed from flat sheet material with a vertical non-glare eye-shield wall having a straight-line bottom marginal edge adapted to extend horizontally across the medial line of vision, an intermediate reversely-bulged nose-rest portion, and end portions adapted for head-support connections.

2. As a new article of manufacture, a non-glare eye shield formed from flat sheet material with a vertical non-glare eye-shield wall having a straight-line bottom marginal edge adapted to extend horizontally across the medial line of vision, a horizontal reenforcing rib near the upper marginal edge, an intermediate reversely-bulged nose rest portion below said rib, and end portions adapted for head support connections.

In testimony whereof I affix my signature.

FRED W. BONNER.